United States Patent
Rahman et al.

(10) Patent No.: US 9,614,703 B2
(45) Date of Patent: Apr. 4, 2017

(54) CIRCUITS AND METHODS PROVIDING HIGH-SPEED DATA LINK WITH EQUALIZER

(71) Applicant: QUALCOMM Incorporated, San Diego, CA (US)

(72) Inventors: Mohammed Mizanur Rahman, San Diego, CA (US); Thomas Clark Bryan, Carlsbad, CA (US); Jacob Stephen Schneider, San Diego, CA (US); LuVerne Ray Peterson, San Diego, CA (US); Tin Tin Wee, San Diego, CA (US); Alvin Leng Sun Loke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/852,088

(22) Filed: Sep. 11, 2015

(65) Prior Publication Data

US 2016/0294585 A1    Oct. 6, 2016

Related U.S. Application Data

(60) Provisional application No. 62/140,391, filed on Mar. 30, 2015.

(51) Int. Cl.
*H04L 25/08* (2006.01)
*H04L 25/03* (2006.01)
(Continued)

(52) U.S. Cl.
CPC .......... *H04L 25/08* (2013.01); *H04L 25/0278* (2013.01); *H04L 25/0298* (2013.01);
(Continued)

(58) Field of Classification Search
CPC . G11C 7/1048; G11C 7/1078; H04L 25/0278; H04L 25/0298; H04L 25/03885;
(Continued)

(56) References Cited

U.S. PATENT DOCUMENTS 7,200,769 B1 * 4/2007 Chong ................. G11C 7/1051
   713/501
7,230,989 B2 6/2007 Biman et al.
(Continued)

FOREIGN PATENT DOCUMENTS

EP        2106027 A1     9/2009
JP        2010268154 A  11/2010

OTHER PUBLICATIONS

Kim et al., "Programmable and automatically adjustable on-die terminator for DDR3-SRAM interface," Custom Integrated Circuits Conference, 2003. Proceedings of the IEEE 2003, 2003, pp. 391-394.*

(Continued)

*Primary Examiner* — Michelle M Koeth
(74) *Attorney, Agent, or Firm* — Haynes and Boone, LLP

(57) ABSTRACT

Methods, systems, and circuits for providing reception and capture of data using a mismatched impedance and an equalizer to save power are disclosed. A data receiver in communication with a transmission line, the data receiver having a termination impedance that is mismatched with respect to a characteristic impedance of the transmission line; and an equalizer in communication with the data receiver, the equalizer configured to receive a channel-transmitted data signal from the data receiver and to re-shape the signal to reduce distortion RC attenuation; wherein the circuit is configured to selectably operate in a first mode wherein the termination impedance is matched with respect to the characteristic impedance of the transmission line and a second mode wherein the termination imped- (Continued)

ance is mismatched with respect to the characteristic impedance of the transmission line and the signal is not recoverable but for the equalizer.

28 Claims, 6 Drawing Sheets

(51) Int. Cl.
  *H04L 25/02*  (2006.01)
  *H04B 1/16*  (2006.01)
(52) U.S. Cl.
  CPC .............. *H04L 25/03* (2013.01); *H04B 1/16* (2013.01); *H04L 25/029* (2013.01); *H04L 25/03878* (2013.01)
(58) Field of Classification Search
  CPC ....... H04L 25/029; H04L 25/03; H04L 25/08; H04L 25/03878; G11B 2005/0013; H03H 7/38; H03K 19/0005; H04B 3/145; H04B 1/16
  See application file for complete search history.

(56) References Cited

U.S. PATENT DOCUMENTS

| | | | |
|---|---|---|---|
| 7,969,256 B2 | 6/2011 | Otsuka et al. | |
| 8,680,937 B2 | 3/2014 | Chang et al. | |
| 8,886,055 B1* | 11/2014 | Morero | H04L 1/0041 |
| | | | 398/192 |
| 8,922,292 B2* | 12/2014 | Wang | H04L 25/0278 |
| | | | 333/17.3 |
| 9,118,511 B1* | 8/2015 | Ransijn | H04B 3/145 |
| 2007/0073506 A1* | 3/2007 | Boskovic | G01R 31/30 |
| | | | 702/107 |
| 2014/0159769 A1* | 6/2014 | Hong | H03K 19/0005 |
| | | | 326/30 |
| 2014/0211095 A1 | 7/2014 | Dickens et al. | |
| 2014/0281075 A1 | 9/2014 | Hollis | |

OTHER PUBLICATIONS

International Search Report and Written Opinion—PCT/US2016/022508—ISA/EPO—Jun. 14, 2016.

* cited by examiner

CIRCUITS AND METHODS PROVIDING HIGH-SPEED DATA LINK WITH EQUALIZER

CROSS REFERENCE TO RELATED APPLICATIONS

The present application claims priority to and the benefit of the U.S. Provisional Patent Application No. 62/140,391, filed Mar. 30, 2015 which is hereby incorporated by reference in its entirety

TECHNICAL FIELD

This application relates to data receivers, and more specifically, to circuits and methods that include an equalizer to re-shape signals from a high-speed data link with a deliberate impedance mismatch between channel and receiver termination for link power reduction.

BACKGROUND

In any high-speed data link, it can be challenging to recover correctly at the receiving side data that have been transmitted. With ever-increasing bandwidth, high frequency transmission may incur more loss in the channel that is connecting receiver to transmitter.

To ensure signal integrity at both transmitting side and receiving side, some conventional systems include a transmitter with a certain output impedance to match the characteristic impedance of the channel. At the receiving side, there is a receiver with termination impedance typically matching the characteristic impedance of the channel. This is done with signal integrity as a goal because impedance matching reduces or eliminates reflected energy from the receiving side. Moreover, any reflected energy from the receiver will undergo secondary reflections back at the transmitter should transmitting impedance not match the channel impedance, thereby further degrading signal integrity of subsequent bits at the receiver.

Conventional transmission lines in high-speed links may have a characteristic impedance of about 50 ohms However, setting the receiver termination resistance to as low as 50 ohms may lead to undesirably high power consumption incurred by the transmitter. But simply increasing the termination resistance at the receiver to reduce power consumption may not be a proper solution because it would increase reflected energy, thereby reducing signal integrity that could ultimately result in bit errors at the receiver. Accordingly, power consumption and signal integrity compete for consideration in conventional designs.

Furthermore, conventional Double Data Rate (DDR) memory interfaces may deviate sometimes from a matched impedance. For instance, as signal bit rates increase, a conventional DDR system may adjust a termination resistance at the receiver to match or nearly match the impedance of the channel. But as signal bit rates are decreased, it may be possible to increase receiver termination resistance in order to save power as long as the signal is still recoverable. However, for a given bit rate, there is a limit to the amount of impedance mismatch that may be tolerated.

It would be desirable to use a higher impedance with higher bandwidths while maintaining integrity of the received signal.

SUMMARY

Methods, systems, and circuits for receiving channel-transmitted digital signals are disclosed herein. One example embodiment includes a system having a transmitter and receiver communicating over a transmission channel. The receiver has an adjustable termination impedance and an equalizer circuit. The system may operate at a variety of different data transmission rates and at a variety of different termination impedance values.

The example system operates so that the termination impedance may be adjusted to a high value and mismatched with respect to the characteristic impedance of the transmission channel. When the termination impedance is at a high value, the system may benefit from decreased power consumption due to reduced current drawn by the termination resistance. The receiver equalization circuit is used to reshape the signal, thereby ameliorating the signal distortion caused by mismatch of the transmission channel characteristic impedance and termination impedance.

Another example embodiment includes a method for operating a system, such as the one described above. The example method includes receiving the data signal from the transmission line, reshaping the data signal using the equalizer so that signal distortion is reduced, and capturing the data signal. The system may be operated so that the termination impedance is high, and the termination impedance is adjustable and may be adjusted to be lower so that it can be matched or nearly matched to the transmission line impedance. Furthermore, the system may be operated at a variety of different data rates, even using a mismatched termination impedance with a high data rate.

DETAILED DESCRIPTION

Figure 1:
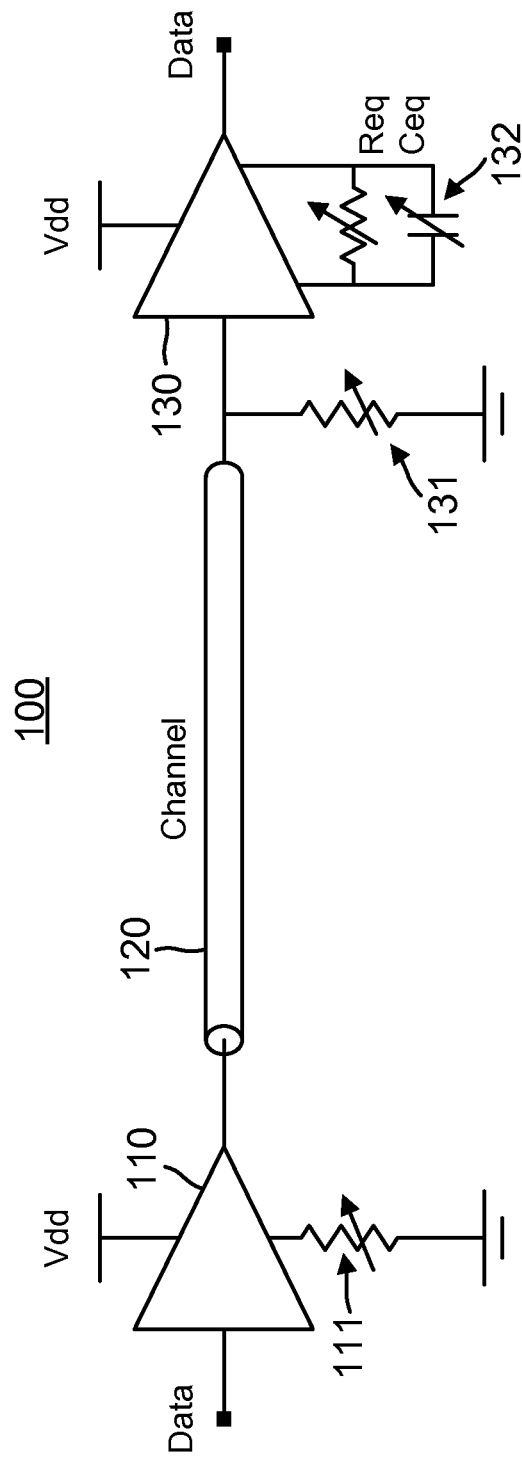
FIG. 1 is a simplified block diagram of an example data transmitter and receiver system, according to one embodiment.

An example embodiment includes a receiver and a communication channel as shown in FIG. 1. As described in more detail below, the receiver has an equalizer and an adjustable termination impedance. During some operating modes, the termination impedance is set to be mismatched with respect to the characteristic impedance of the channel, where the termination impedance is high in order to save power. The equalizer reshapes the received data signal.

FIG. 1 is an illustration of an example data transmitting system 100, according to one embodiment. System 100 includes a transmitter 110, which has terminating impedance 111. In this example, the terminating impedance 111 is used to match a characteristic impedance of the transmission channel 120. However, in other embodiments, terminating impedance 111 may be adjusted to any appropriate value.

Transmitter 110 receives digital data at its data input (labeled "Data") as a series of high and low voltage values.

Transmission channel 120 provides a data link between transmitter 110 and receiver 130. Transmission channel 120 may be embodied in any appropriate structure, for example, a cable, a metal trace on a printed circuit board, a metal wire connecting chips in a package, and the like. In FIG. 1, transmission channel 120 is shown as a transmission line in order to emphasize its similarities with transmission lines in general, including having a characteristic impedance as well as a Resistane-Capacitance (RC) time constant.

Data receiver 130 receives the transmitted data signal from transmission channel 120. Receiver 130 has an adjustable termination impedance 131, which may be set to any appropriate value. Receiver 130 also includes equalizer circuit 132, which acts to reshape the received data signal, where the received data signal may be distorted due to transmission line reflections, RC attenuation, or other phenomena.

In FIG. 1, equalizer circuit 132 is shown as including a capacitor (Ceq) and a resistor (Req). The scope of embodiments is not limited to any specific equalizer circuit. Furthermore, the values of the resistive and capacitive components may be chosen in accordance with the principles discussed more fully with respect to FIG. 3.

Termination impedance 131 is adjustable. In at least one operating mode, termination impedance 131 may be set at a value that is matched or nearly matched with a characteristic impedance of transmission line 120. In another operating mode, termination impedance 131 is set at a value that is higher than the characteristic impedance of transmission line 120. For instance, the termination impedance 131 of the receiver 130 may be set at 120 ohms, whereas the characteristic impedance of the transmission line 120 is around 50 ohms Therefore, the mismatch ratio of the termination impedance to the impedance of the transmission line is almost 2.5:1. In another operating example, the termination impedance 131 of the receiver 130 may be set at 60 ohms, as compared to 50 ohms for the characteristic impedance of the transmission line 120.

Adjusting the termination impedance 131 to a relatively high value may be advantageous in some instances because it can reduce the power consumed by data transmitter 110 to deliver current to the termination impedance 131. In fact, some simulations indicate that increasing the termination impedance 131 to 120 ohms may decrease power usage of the data transmitter 110 by around 50%. However, increasing the termination impedance 131 of the receiver 120 can be expected to increase an RC time constant of the system 100, thereby decreasing channel bandwidth of system 100 and reducing the maximum rate at which data may be transmitted by transmitter 110 and reliably received by receiver 130.

Figure 2:
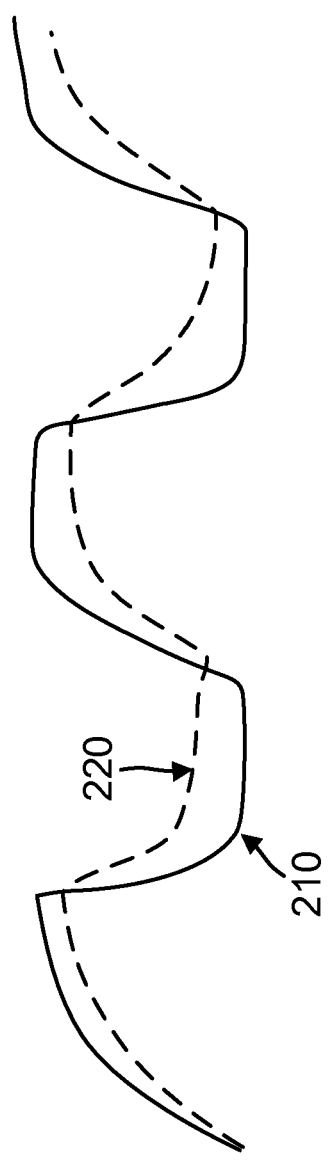
FIG. 2 is an illustration of a transmitted signal juxtaposed with a distorted signal, according to one embodiment.

Furthermore, the impedance mismatch may also impair signal integrity at the receiver 130 as a result of reflection. As an example, FIG. 2 provides an illustration of the effects on signal integrity that may be attributed to RC attenuation by a high termination impedance. Signal 210 is an illustration of an example digital signal as it would appear at the output of transmitter 110 of FIG. 1. Although the signal is in theory a square wave, in a real-world setting it is often shaped so that the falling and rising edges are asymptotic. The signal 210 should be able to be recovered without the use of an equalizer, since the high and low values are relatively distinct.

However, the RC time constant of the system may make the rising and falling edges more gradual, thereby making it more difficult to discern high and low value portions of the signal. For instance, increasing a termination resistance of either the transmitter or the receiver may be expected to increase the RC time constant of the system. And specifically, in the example above where the receiver termination impedance 131 is increased so that the mismatch ratio is between 2:1 and 3:1, the signal 210 may be distorted so that it appears like signal 220 at the input of the receiver 130.

Equalizer circuit 132 is used by the system 100 to reshape the digital signal so that it is output from the receiver 130 in a form that more closely matches the signal 210 of FIG. 2. In FIG. 1, the data is output from the receiver 130 at the output port on the right hand side labeled "Data." Although not shown in FIG. 1, a flip-flop or other data recovery circuit may capture the values of the data signal as it appears at the data output port. Use of the equalizer circuit 132 to reshape the digital signal may reduce the risk of errors in capturing the data signal. In some embodiments it may be desirable to reshape signal 210 but not to over-sharpen signal 210. Overly sharp transitions in general may have relatively large amounts of high frequency content which couples energy more readily to adjacent channels. This is crosstalk and can happen via means of electric (capacitive) or magnetic (inductive) field coupling to adjacent channels.

Figure 3:
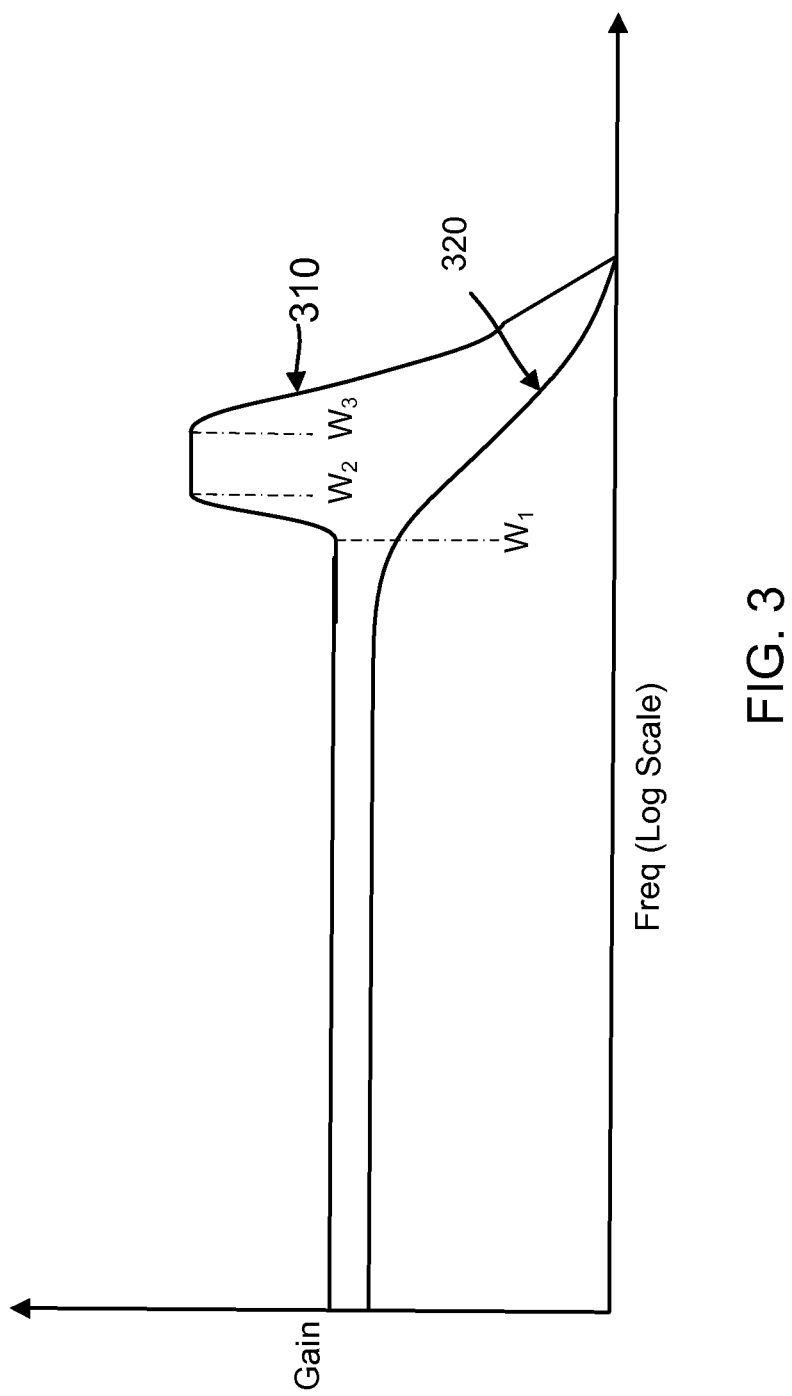
FIG. 3 is an illustration of a frequency response of an example equalizer circuit, according to one embodiment.

FIG. 3 is an illustration of frequency responses of an example equalizer and an example transmission channel, according to one embodiment, in the form of a logarithmic graph. The frequency response of the transmission channel 120 of FIG. 1 is illustrated by curve 320. In short, the frequency response of the transmission channel 120 resembles that of a low-pass filter. Accordingly, the data signal as it appears at the input to data receiver 130 may have its higher-frequency components attenuated.

Curve 310 shows an example frequency response of equalization circuit 132. The frequency response of the equalization circuit 132 includes a lower-frequency portion that has a substantially flat gain. The frequency response of the equalization circuit 132 (as illustrated in curve 310) begins to increase in gain at a point where the frequency response of the transmission channel 120 (curve 320) drops off.

The resistive values and capacitive values of the equalization circuit 132 may be chosen so that they provide a frequency response similar to that of curve 310. The frequency response of a given equalization circuit is defined by its placement of poles and zeros. Therefore, the resistive and capacitive values may be chosen so that they provide desired placements of poles and zeros. For instance, in the example of FIG. 3, the frequency response of the equalization circuit 132 would include a zero at point W1, a pole at point W2, and another pole at point W3. This causes the frequency response to apply a gain or frequency response peaking at portions of the data signal that would be attenuated by the frequency response of the transmission channel 120. However, the frequency response of the equalization circuit 132 also drops off after point W3 so as not to apply gain to portions of the spectrum that are not part of the data signal. In some examples, the pole at W3 is due to the natural frequency limitation of the receiving amplifier and is technology dependent.

The scope of embodiments is not limited to any particular frequency response for the equalization circuit 132 nor any particular frequency response for the transmission channel 120. In fact, the transmission channel 120 may have a different frequency response depending on the particular application and the structure of the transmission channel 120, as well as the expected termination resistance. Furthermore, the scope of embodiments for the architecture of the equalizer circuit 132 is not limited to a single resistor and a single capacitor in parallel, as any appropriate architecture for the equalization circuit may be implemented. For instance, in many applications, the desired frequency response of the equalization circuit will determine the architecture of the equalization circuit, including the number of components, the series and parallel connections of the components, and the values of the components.

Figure 4:
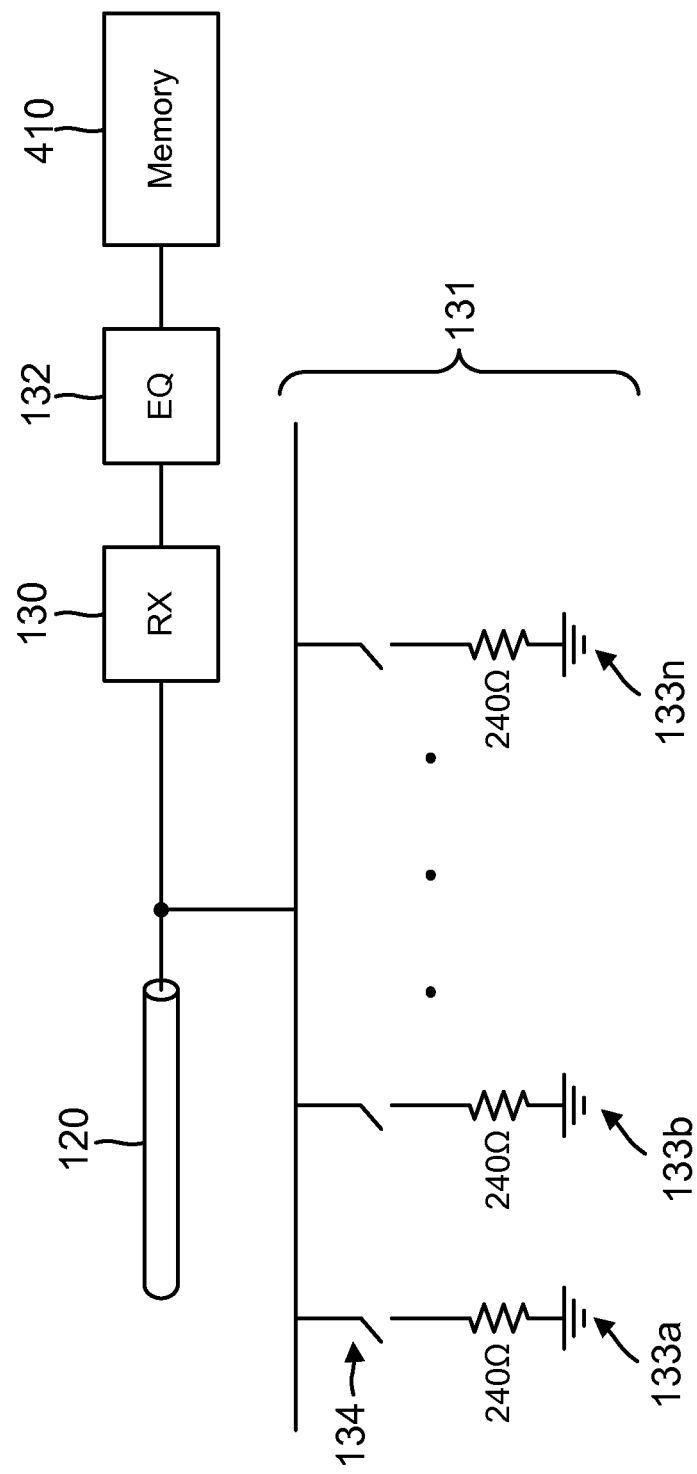
FIG. 4 is an illustration of an example receive-side architecture for receiving a data signal from a transmission line, according to one embodiment.

FIG. 4 is an illustration of a portion of system 100 of FIG. 1, according to one embodiment. FIG. 4 illustrates an example architecture for termination impedance 131, which includes a plurality of switched resistor legs 133a-133n (where n is an integer greater than zero). Taking resistive leg 133a as an example, such resistive leg includes a switch 134, which can be opened and closed so that its corresponding 240 ohm resistor may either be included in the total parallel resistive value or not. Switch 134 may be embodied in any appropriate way, such as through use of a transistor that can be opened or closed. Since the resistive legs 133 are in parallel, the more switches that are closed, the lower the parallel resistive value. Signals to open and close the switches (e.g., switch 134) may be provided by a control circuit (not shown) that is part of a memory controller or other component at the receive side.

Various DDR standards include selecting an appropriate termination impedance 131 according to a data rate of the data signal. For instance, conventional DDR standards may include matching or nearly matching a value of the termination impedance 131 to a value of the characteristic impedance of the transmission channel 120 for high data rate signals. When the data rate is high, signal distortion may make it more difficult to capture the signal, so that matching impedance may be advantageous to minimize distortion of the signal. On the other hand, when the data rate is lower, the termination impedance 131 may be increased to save power, but the distortion of the signal at the lower data rate might not adversely affect the receiver's ability to capture the signal.

One embodiment of the system of FIGS. 1 and 4 allows for an adjustable termination impedance 131 that is kept relatively high even at higher data rates. This is counterintuitive because it would normally be expected that a high termination impedance 131 would increase the RC time constant of the channel, thereby decreasing the quality of the signal received by receiver 130 and inhibiting recovery of the signal. However, the embodiment of FIGS. 1 and 4 includes equalization circuit 132 to provide reshaping of the signal and to minimize the effect of distortion. Accordingly, a high value for the termination impedance 131 may be selected even at higher data rates to reduce power consumption. Equalizer 132 in this embodiment may include a continuous-time linear equalizer (CTLE) that undoes the RC signal attenuation in the channel 120. More sophisticated equalization, such as decision feedback equalization (DFE) may be used in other embodiments to undo the effects of signal reflection, although implementation of a DFE is more complex than implementation of a CTLE.)

Nevertheless, the embodiment of FIGS. 1 and 4 is configured to operate in at least two modes. In a first mode, the termination resistance is kept that a high value so that there is significant mismatch with respect to the characteristic impedance of the communication channel 120 (e.g., a ratio between 2:1 and 3.1 of the termination impedance and the characteristic impedance of the communication channel). This is true even at relatively high data rates (e.g., 3200 Mbit per second in a mobile DDR embodiment), so that there is significant signal distortion at a level that the signal would be unrecoverable but for the operation of the equalizer circuit 132. Put another way, the received data signal at the input to the receiver 130 would have significant distortion, but the frequency response of the equalization circuit 132 works to reshape the signal so that it is recoverable by a flip-flop or other circuit at memory 410.

In a second mode, the termination impedance 131 is adjusted so that it is matched or approximately matched with the characteristic impedance of the communication channel 120. This is true at high data rates, and even if desired at lower data rates as well. In such instance, the signal may be recoverable even without the equalizer circuit 132. Or put another way, the digital signal may experience little distortion at the input of receiver 130 so that it would be recoverable even if the signal bypassed the equalizer circuit 132 and went straight to a flip-flop or other capturing circuit at memory 410. It should be noted, though, that the presence of equalizer circuit 132 would not cause enough distortion by itself to prevent the signal from being captured at memory 410.

Therefore, the system 100 of FIGS. 1 and 4 has an adjustable termination resistance 131, providing for multiple modes of operation. However, during some modes of operation, the termination impedance 131 may be at a relatively high and mismatched value, thereby necessitating the use of equalizer circuit 132.

The scope of embodiments is not limited to the specific structure shown in FIG. 4. For instance, while the resistive legs of termination impedance 131 are shown as having 240 ohm resistors, the scope of embodiments includes any appropriate number of legs and any appropriate resistive values for the resistors in those legs. Furthermore, while not shown in FIG. 4, each resistive leg of terminal resistance 131 includes a parasitic capacitance that is present regardless of whether the resistive leg is selected or not. The transmission channel 120 also includes a parasitic capacitance, where the parasitic capacitance affects the RC constant of the transmission line 120. The equalizer circuit 132 may be designed to take into account the parasitic capacitance constituting part of the impedance experienced by the data signal as it is transferred over transmission channel 122 receiver circuit 130.

An advantage of some embodiments includes a reduced number of legs 133 as compared to conventional DDR systems. Specifically, since the equalizer 132 may provide for use of higher values of termination impedance 131, then some systems may include a fewer number of legs 133, thereby reducing the total parasitic capacitance at the receiver side. Capacitance constitutes the imaginary component of the termination impedance and increases signal reflection at receiver 130 even if the real component of the termination impedance 131 (resistance), matches the characteristic impedance of the transmission channel, so that a decreased number of legs 133 may actually reduce signal reflection.

Figure 5:
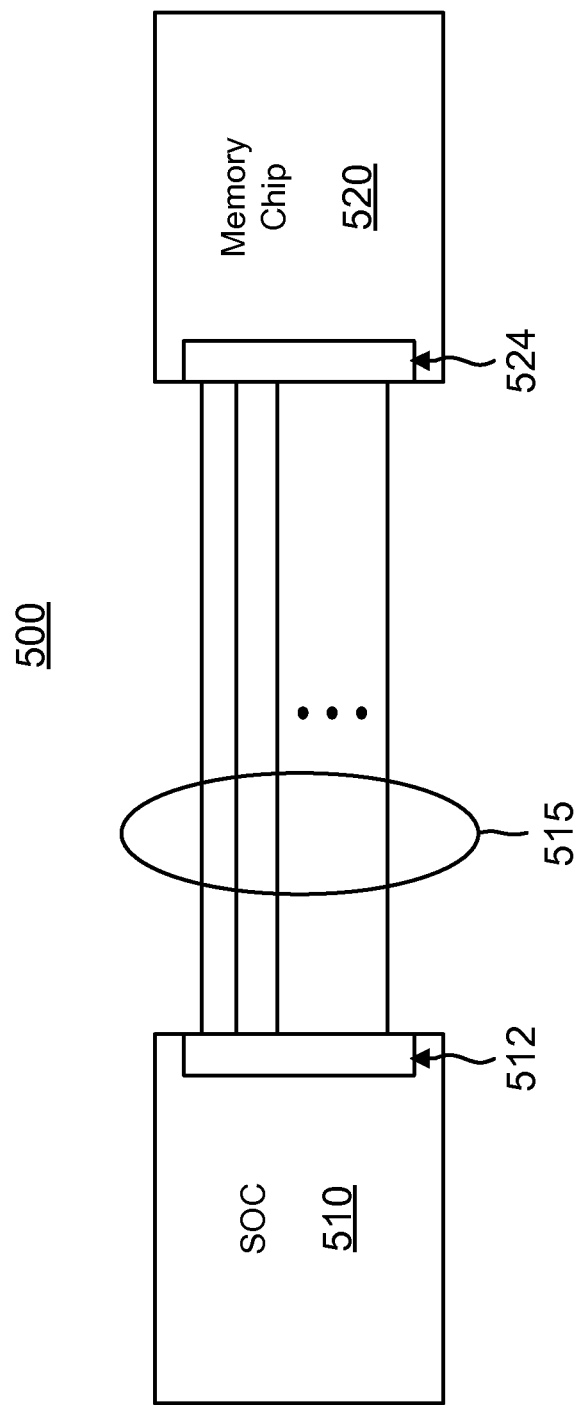
FIG. 5 is an illustration of an example system using a multitude of transmitters and receivers, such as those illustrated with respect to FIGS. 1 and 4, according to one embodiment.

FIG. 5 is an illustration of an example application of the signal transmission systems of FIGS. 1 and 4, according to one embodiment. FIG. 5 illustrates a system 500 in which a system on a chip (SOC) 510 is in communication with a memory chip 520. SOC 510 communicates with memory chip 520 over transmission channels 515.

SOC 510 includes a multitude of cores (not shown) implemented in a chip. The cores may include any appropriate computing core, where examples include a mobile station modem, a central processing unit (CPU), a graphics processing unit (GPU), a digital signal processor (DSP), a 802.11x modem, and/or the like. In some examples, SOC 510 is specifically made for a mobile device, such as a smart phone, such that the cores are designed for low power consumption. However, the scope of embodiments is not limited to any specific SOC architecture.

Memory chip 520 in this example includes any appropriate memory chip for use in a computing device with SOC 510. Examples include a Static Random Access Memory (SRAM) chip, a Dynamic Random Access Memory (DRAM) chip, a Synchronous Dynamic Random Access Memory (SDRAM), and an electrically erasable programmable read-only memory (Flash memory) chip, although the scope of embodiments is not limited to any particular memory chip. During a write operation, memory chip 520 receives data from SOC 510 over transmission channels 515, and a memory controller at memory chip 520 then stores that data in memory cells of the memory chip. During a read operation, memory chip 520 receives a read request for specific data from SOC 510, and the memory controller of memory chip 520 then accesses the data from various memory cells of the memory chip and transmits those bits of data to the SOC 510 over transmission channels 515.

The system of FIG. 5 may include implementations of the systems shown in FIGS. 1 and 4. In one example, system 500 of FIG. 5 is operated according to one or more DDR standards, where memory chip 520 is a DDR SDRAM chip. Memory chip 520 includes a multitude of receiver circuits configured to receive data over respective transmission channels 515. It is expected that there would be many receivers and many transmitters at memory chip 520, so the transmitters and receivers are shown collectively at TX/RX circuit 524. Each one of the receiver circuits operates as described above with respect to FIGS. 1 and 4, including having an equalization circuit and an adjustable termination impedance. Each one of the individual transmission channels 515 are the same as or similar to transmission channel 120 of FIGS. 1 and 4, including having a characteristic impedance and a frequency response.

Similarly, SOC 510 also has a multitude of receiver circuits configured to receive data over respective transmission channels 515. Transmitters and receivers of SOC 510 are shown collectively in this example as TX/RX circuit 512. Each one of the receiver circuits operates as described above with respect to FIGS. 1 and 4, including having an equalization circuit and an adjustable termination impedance. Although not described in detail here in, it is understood that the transmitter circuits in each of TX/RX circuits 512 and 524 may have a similar structure and operates similarly to transmitter circuit 110 of FIG. 1.

In various DDR standards, the termination impedance at a given receiver circuit may be may be adjusted according to the data rate. For instance, at a 400 Mbit per second data rate, a relatively high termination resistance may be used at the various receiver circuits. The 400 Mbit per second data rate is relatively low for DDR purposes, and it is understood that signals may be resolved and captured reliably at 400 Mbit per second even with a relatively high termination resistance at the receiver circuits.

Continuing with a conventional DDR example, 3200 Mbit per second is considered a high data rate for mobile DDR. Conventional DDR may apply a matched or nearly matched termination resistance at the receivers to minimize reflection and other distortion and maximize signal integrity. However, conventional DDR systems do not include equalizer circuits (e.g., circuit 132 of FIG. 1).

In the present embodiment, each of the receivers in circuits 512 and 524 includes an equalizer circuit that is tuned according to the principles described above with respect to FIG. 3. The equalizer circuits ensure that the data signal may be reliably resolved and captured at 3200 Mbit per second even with a mismatch ratio of the termination impedance to the characteristic impedance of the transmission line of between 2:1 and 3:1 (e.g., 120 ohms termination resistance and a 50 ohm characteristic impedance of the transmission channel).

In some embodiments, the equalizer circuits (e.g., as shown at item 132 of FIG. 1) include adjustable resistive components and capacitive components and may be tuned and set at values that are expected to produce reliable results with respect to a given circuit. An example technique includes manufacturing a chip that includes a plurality of receiver circuits having respective equalizer circuits. Some or all of the receivers may then be tested for signal integrity at relatively high termination resistance values and at a variety of different frequency response settings. For each of the receivers, a frequency response setting is chosen based on the testing results, where the frequency response setting corresponds to selectable R and C values of the associated equalizer circuit. The frequency response settings may then be stored in memory and applied at power up of the chip. In another embodiment, frequency response settings of the equalizer circuits may be adaptively applied during operation of the chip by testing signal integrity against frequency response settings and choosing the frequency response settings that provide desired performance.

Various embodiments may include one or more advantages over conventional solutions. For instance, some of the embodiments described herein allow for reliable capture of data at relatively high data rates, but with decreased power consumption (e.g., 50%) as compared to conventional DDR techniques. As described above, various embodiments achieve power savings by applying a high termination impedance even at high data rates, while using an equalization circuit to reshape the received signals. In practice, many circuits experience power consumption due to the added equalizer circuits, but that power consumption attributed to activating the equalizer circuits will generally be lower than the power savings achieved by having a high termination impedance.

Figure 6:
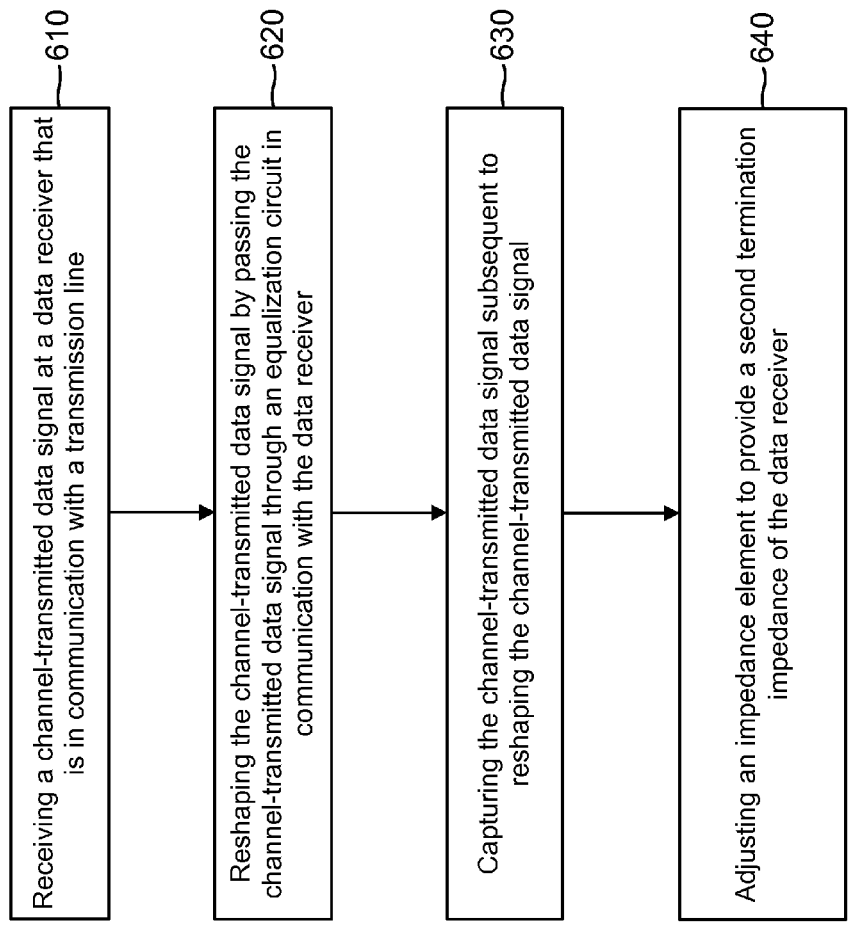
FIG. 6 is an illustration of an example method that may be performed by the circuits of FIGS. 1, 4, and 5, according to one embodiment.

FIG. 6 is an illustration of an example method 600, according to one embodiment. Method 600 may be performed by circuits, such as those shown in FIGS. 1, 4, and 5. Specifically, the data receiver having a high and mismatched termination impedance and also having an equalizer circuit to reshape the received data signals, may perform method 600. Furthermore, the data receiver has an adjustable termination impedance and is configured to operate at a variety of different data rates. This allows the data receiver to operate in at least two modes; a first mode includes impedance-mismatched operation, and a second mode includes impedance-matched operation.

At action 610, the data receiver receives a channel-transmitted data signal. In this example, the data receiver has a termination impedance that is mismatched with respect to a characteristic impedance of the transmission line from which the data signal is received. Although the mismatch of the termination characteristic impedance and the transmission line impedance may vary with different applications, in one example the termination impedance of the data receiver is higher than the characteristic impedance of the transmission line by a ratio of at least 2:1.

Further in this example, the high termination impedance imposes RC attenuation signal distortion so that the data signal is otherwise unrecoverable as it is received at the input to the data receiver from the transmission channel. An example is shown at FIG. 2, where received signal 220 includes a relatively high amount of distortion. Of course, whether the signal can be captured depends upon the accuracy of the capturing circuit, such as a flip-flop that is clocked at a particular frequency. In this example, the flip-flop would not be able to recognize reliably a high or a low voltage level in signal 220. Or put another way, the data signal as it is received at the input from the transmission channel would not be recoverable but for the signal shaping that is performed by the equalization circuit.

At action 620, the signal is reshaped by being passed through an equalization circuit that is in communication with the data receiver. An example is shown at FIG. 1, where equalization circuit 132 is provided for reshaping the signal. FIG. 2 illustrates an example in which a received signal 220 is compared to the originally transmitted signal 210. The equalization circuit 132 has a frequency response that reshapes the data signal so that the data signal more closely resembles transmitted signal 210.

At action 630, the receiver captures the channel transmitted data signal after the signal is reshaped by the equalizer circuit. For instance, a flip-flop or other circuit may be used to save the ones and zeros that are captured from the reshaped data signal.

At action 640, an impedance element of the data receiver is adjusted to provide a second termination impedance of the data receiver. At action 640, the second termination impedance is lower than the first termination impedance and may be matched or nearly matched with the characteristic impedance of the transmission channel. Further in this example, the amount of reflection-induced or other distortion at the input of the data receiver is at a level that is low enough that the signal would otherwise to be recoverable even without the action of the equalizer circuit. For instance, with reference to FIG. 2, the signal at the input of the data receiver would more closely resemble signal 210 than signal 220. In some examples, action 640 may also include adjusting a data rate of the system. For instance, the data rate of the system may be adjusted up or down as appropriate.

However, the equalizer circuit is present at the data receiver, whether the termination impedance is matched or mismatched with respect to the transmission channel impedance. Nevertheless, the data receiver continues to operate at the lower termination impedance level, and the equalizer circuit does not significantly degrade the signal or prevent the signal from being captured. The data receiver performs actions 610-630 at the lower, second termination impedance until the termination impedance is again adjusted.

Thus, as described above, the data receiver has an adjustable termination impedance and an equalizer circuit allowing it to operate in at least two modes. One mode is described with respect to a significant mismatch of termination impedance and transmission line impedance. In this mode, the termination impedance is kept high to provide for power consumption savings during operation. The high termination impedance causes RC attenuation distortion of the signal, where the signal is then reshaped by the equalizer circuit. A second mode is described above with respect to action 640, where the termination impedance is adjusted to be matched or nearly matched with respect to the transmission line impedance. In the second mode, the power savings may not be as substantial as in the first mode of operation, but the second mode is available by virtue of the termination impedance being adjustable. In the second mode, the equalization circuit is not required to make the signal capturable, but the equalization circuit is present nevertheless.

The scope of embodiments is not limited to the actions shown in FIG. 6. Other embodiments may add, omit, modify, or rearrange one or more actions. For example, during operation of the circuits of FIGS. 1 and 4, the actions 610-630 are performed at each clock cycle to capture each value of the data signal. The actions 610-630 are performed at any termination impedance provided by the data receiver. Furthermore, it is understood that adjustments to the data rate and to the termination impedance may be performed by a memory controller or other appropriate circuit during method 600.

Moreover, one example includes performing method 600 at DDR data rates and according to one or more DDR standards, but at times using a mismatched impedance that necessitates use of an equalizer circuit to reshape the signal. However, the scope of embodiments is not limited to DDR standards or data rates.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A circuit comprising:
a data receiver in communication with a transmission line, the data receiver having an impedance element with a termination impedance that, while receiving data, is mismatched with respect to the characteristic impedance of the transmission line, the termination impedance of the data receiver being higher than the characteristic impedance of the transmission line by a ratio of at least 2:1;
an equalizer in communication with the data receiver, the equalizer configured to receive a channel-transmitted data signal from the data receiver and to re-shape the signal to reduce attenuation distortion; and
a data recovery circuit configured to capture values of the re-shaped channel-transmitted data signal;
wherein the impedance element is configured to reduce the termination impedance of the data receiver to a level in which the attenuation distortion of the channel-transmitted data signal is reduced to a level in which the channel-transmitted data signal is recoverable without use of the equalizer after the data recovery circuit captures the values of the re-shaped channel-transmitted data signal.

2. The circuit of claim 1, wherein the circuit is configured to selectably operate in a first mode wherein the termination impedance is matched with respect to the characteristic impedance of the transmission line and a second mode wherein the termination impedance is mismatched with respect to the impedance of the transmission line and the signal is not recoverable but-for the equalizer.

3. The circuit of claim 1, wherein the data receiver is included in a Double Data Rate (DDR) memory device.

4. The circuit of claim 1, wherein the data receiver is included in a system on a chip.

5. The circuit of claim 1, wherein the termination impedance of the data receiver is adjustable.

6. The circuit of claim 5, wherein the termination impedance is provided by the impedance element having a plurality of selectable resistance elements.

7. The circuit of claim 1, wherein the mismatch ratio of the termination impedance to the characteristic impedance of the transmission line is between 2:1 and 3:1.

8. The circuit of claim 1, wherein the data receiver is configured to accept a variable data rate for the channel-transmitted data signal.

9. The circuit of claim 1, further comprising a transmitter in communication with the transmission line, the transmitter configured to originate the channel-transmitted data signal, wherein the transmitter includes an adjustable termination impedance.

10. The circuit of claim 1, further comprising a flip-flop configured to capture bits of data from the receiver.

11. A method comprising:
receiving a channel-transmitted data signal at a data receiver that is in communication with a transmission line, the data receiver having a termination impedance that is mismatched with respect to a characteristic impedance of the transmission line, wherein the termination impedance of the data receiver is higher than the characteristic impedance of the transmission line by a ratio of at least 2:1;
reshaping the channel-transmitted data signal by passing the channel-transmitted data signal through an equalization circuit in communication with the data receiver;
capturing the channel-transmitted data signal subsequent to reshaping the channel-transmitted data signal; and
after capturing the channel-transmitted data signal, reducing the termination impedance of the data receiver to a level in which attenuation distortion of the channel-transmitted data signal is reduced to a level in which the channel-transmitted data signal is recoverable without use of the equalization circuit.

12. The method of claim 11, wherein the data receiver is included in a Double Data Rate (DDR) memory device.

13. The method of claim 11, wherein the data receiver comprises an amplifier.

14. The method of claim 11, wherein the termination impedance is provided by an impedance element having a plurality of selectable resistive elements.

15. The method of claim 11, wherein a mismatch ratio of the termination impedance to the characteristic impedance of the transmission line is between 2:1 and 3:1.

16. The method of claim 11, wherein the equalization circuit is configured to provide a gain to a portion of the channel-transmitted data signal that was attenuated due to a channel and the receiver.

17. A method comprising:
receiving and capturing data at a receiver in communication with a transmission channel, wherein the transmission channel communicates the data from a transmitter to the receiver, wherein receiving and capturing the data includes:
operating the receiver at a first data rate and at a first termination impedance greater than a characteristic impedance of the transmission channel by a ratio of at least 2:1, wherein the first termination impedance causes attenuation distortion of the data so that the data is unrecoverable by the receiver prior to being reshaped by an equalizer at the receiver;
reshaping the data by passing the data through the equalizer;
capturing the data subsequent to reshaping the data; and
after capturing the data, adjusting an impedance element to provide a second termination impedance of the receiver, wherein the second termination impedance is lower than the first termination impedance, further wherein the data is recoverable by the receiver at the second termination impedance without reshaping by the equalizer.

18. The method of claim 17, further comprising adjusting the receiver to operate at a second data rate lower than the first data rate.

19. The method of claim 17 performed by a Double Data Rate (DDR) memory system.

20. The method of claim 17, wherein the data is captured at a flip-flop in communication with the receiver.

21. The method of claim 17, wherein the data is transmitted from a system on a chip, through the transmission channel, and to the receiver at a memory chip.

22. A system comprising:
means for receiving a channel-transmitted data signal from a transmission line, the means for receiving having an impedance element with a termination impedance that, while receiving data, is mismatched with respect to a characteristic impedance of the transmission line, wherein the termination impedance of the means for receiving is higher than the characteristic impedance of the transmission line by a ratio of at least 2:1;
means for reshaping the channel-transmitted data signal by providing gain to portions of the channel-transmitted data signal attenuated by the transmission line and the means for receiving to reduce attenuation distortion; and
means for capturing the channel-transmitted data signal subsequent to reshaping the channel-transmitted data signal;
wherein the impedance element is configured to reduce the termination impedance of the means for receiving to a level in which the attenuation distortion of the channel-transmitted data signal is reduced to a level in which the channel-transmitted data signal is recoverable without use of the means for reshaping after the means for capturing captures the reshaped channel-transmitted data signal.

23. The system of claim 22, wherein the means for receiving is included in a Double Data Rate (DDR) memory element.

24. The system of claim 22, wherein the means for receiving comprises an amplifier.

25. The system of claim 22, wherein the termination impedance of the means for receiving is adjustable.

26. The system of claim 25, wherein the termination impedance is provided by the impedance element having a plurality of selectable resistance elements.

27. The system of claim 22, wherein a mismatch ratio of the termination impedance of the means for receiving to the characteristic impedance of the transmission line is between 2:1 and 3:1.

28. The system of claim 22, wherein the means for receiving is configured to accept a variable data rate for the channel-transmitted data signal.

* * * * *